(12) United States Patent
Zielnicki

(10) Patent No.: US 11,734,747 B2
(45) Date of Patent: Aug. 22, 2023

(54) CONTEXTUAL SET SELECTION

(71) Applicant: Stitch Fix, Inc., San Francisco, CA (US)

(72) Inventor: Kevin J. Zielnicki, Oakland, CA (US)

(73) Assignee: Stitch Fix, Inc., San Francisco, CA (US)

( * ) Notice: Subject to any disclaimer, the term of this patent is extended or adjusted under 35 U.S.C. 154(b) by 0 days.

(21) Appl. No.: 17/539,424

(22) Filed: Dec. 1, 2021

(65) Prior Publication Data

US 2022/0092672 A1 Mar. 24, 2022

Related U.S. Application Data

(63) Continuation of application No. 16/715,867, filed on Dec. 16, 2019, now Pat. No. 11,232,506.

(60) Provisional application No. 62/870,498, filed on Jul. 3, 2019.

(51) Int. Cl.
*G06Q 30/00* (2023.01)
*G06Q 30/0601* (2023.01)
*G06N 20/00* (2019.01)
*G06Q 10/083* (2023.01)

(52) U.S. Cl.
CPC ......... *G06Q 30/0631* (2013.01); *G06N 20/00* (2019.01); *G06Q 10/083* (2013.01)

(58) Field of Classification Search
None
See application file for complete search history.

(56) References Cited

U.S. PATENT DOCUMENTS

| | | | |
|---|---|---|---|
| 2010/0169313 | A1 | 7/2010 | Kenedy |
| 2018/0025379 | A1* | 1/2018 | Hewinson ............... H04L 67/53 705/14.43 |
| 2018/0121953 | A1 | 5/2018 | Zhang |
| 2019/0303995 | A1* | 10/2019 | Li ...................... G06Q 30/0633 |
| 2020/0042610 | A1 | 2/2020 | Boles |

OTHER PUBLICATIONS

Steffen Rendle. Factorization Machines. Department of Reasoning for Intelligence. The Institute of Scientific and Industrial Research. Osaka University, Japan. 2010 IEEE International Conference on Data Mining. Dec. 13-17, 2010.

* cited by examiner

*Primary Examiner* — Mila Airapetian
(74) *Attorney, Agent, or Firm* — Van Pelt, Yi & James LLP

(57) ABSTRACT

An initial list of candidate items automatically evaluated and chosen for an end-user is provided. A selection of one or more items in the initial list of candidate items is received from an expert user different than the end-user to include in an item group set for the end-user. Eligible items are evaluated to identify an additional item to include in the item group set based at least in part on an expert judgement prediction machine learning model trained to predict based at least in part on the one or more items already in the item group set a likelihood of a certain item being evaluated would be selected for inclusion in the item group set. Based on the evaluation, the additional item is included in the item group set. Member items in the item group set are indicated.

20 Claims, 8 Drawing Sheets

CONTEXTUAL SET SELECTION

CROSS REFERENCE TO OTHER APPLICATIONS

This application is a continuation of U.S. application Ser. No. 16/715,867 entitled CONTEXTUAL SET SELECTION filed Dec. 16, 2019, which claims priority to U.S. Provisional Patent Application No. 62/870,498 entitled CONTEXTUAL SET SELECTION filed Jul. 3, 2019, each of which is incorporated herein by reference for all purposes.

BACKGROUND OF THE INVENTION

Computer recommendation systems are used to automatically select an item to recommend to a user. Automatically selecting the best items from vast numbers of possible choices is a complex task that is difficult to perform correctly. Use of machine learning can greatly improve the accuracy of a recommendation system. However, training and deploying the most accurate machine learning model can require a large amount of computing resources that may not be available or may be cost prohibitive. Therefore there is a need for a more efficient way to utilize computer resources in a manner that improves accuracy of recommendation systems.

BRIEF DESCRIPTION OF THE DRAWINGS

Various embodiments of the invention are disclosed in the following detailed description and the accompanying drawings.

FIGS. 6A-6C are diagrams illustrating embodiments of user interfaces for determining a group set of items.

DETAILED DESCRIPTION

Figure 1:
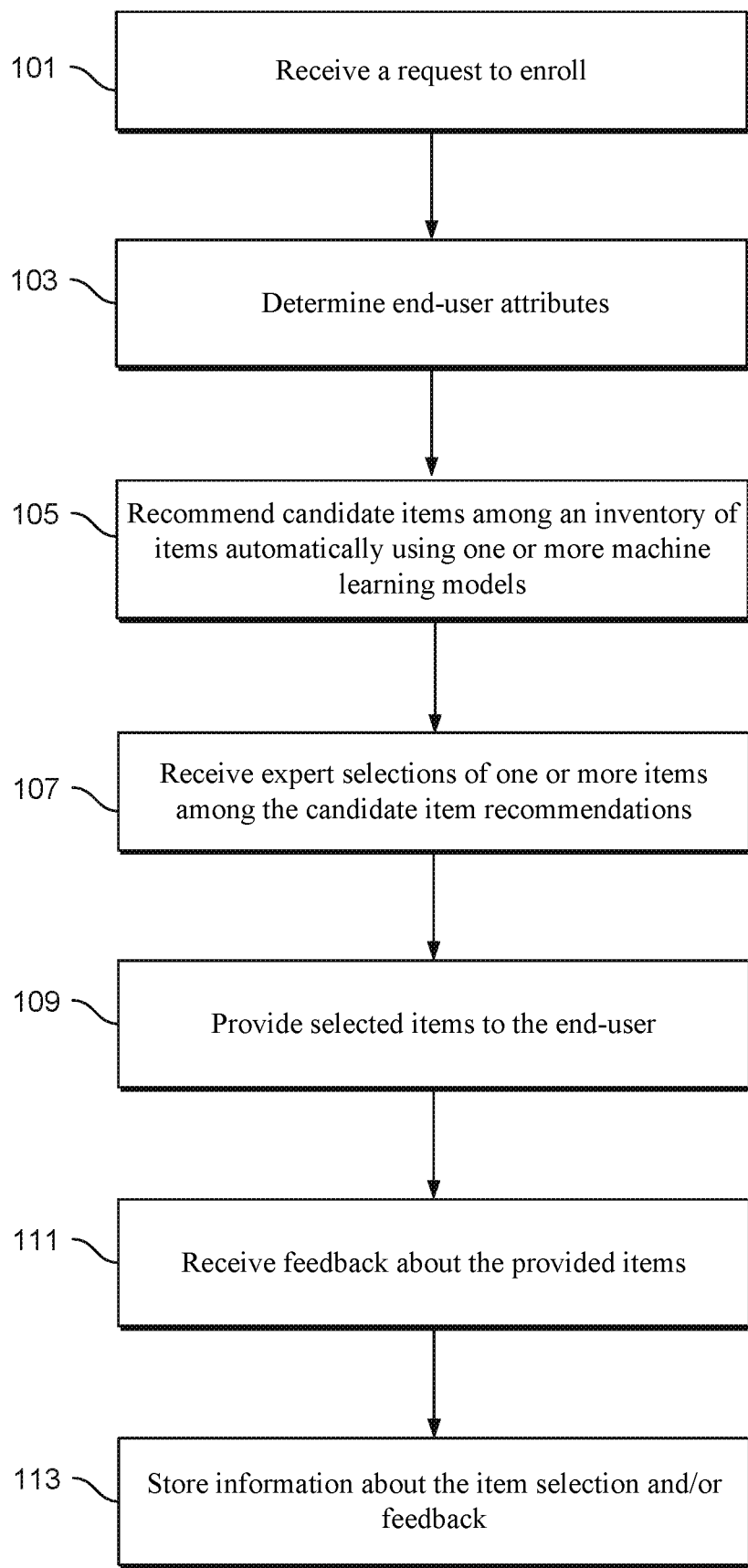
FIG. 1 is a flowchart illustrating an embodiment of a process for recommending and providing items.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As compared to recommending a single item, using machine learning to select a group of items to recommend together requires a greater amount of computer processing to achieve. The required amount of computing goes up exponentially if the items are to be recommended in the context of each other where inclusion of an item in the group affects which other items are in the group. For example, analyzing each distinct set of five items among tens of thousands of possible item choices is a daunting task that may not be feasible within given computer resource constraints, especially in the context of training and deploying a machine learning model for millions of users. Therefore improvements to machine learning architecture and deployment need to be made to provide a solution that still provides accurate results with reduced computing load requirements Recommendation systems can be further augmented with guidance from an expert to increase its overall recommendation accuracy. For example, a human-in-the-loop recommendation system leverages both the computational power of artificial intelligence (AI)/machine learning (e.g., able to analyze a large number of different item options too large for a human to review manually for every user) and the sensibility of a human expert to review recommendations for accuracy and adaptability to situations not able to be handled by the existing AI/machine learning model. The interaction between the artificial intelligence/machine learning and the human reviewer helps mitigate selection bias of the human reviewer and improves accuracy over only using one of machine or human recommendation.

In some embodiments, a recommendation system platform has a user interface, where experts are able to browse for items and add them to a group set of items to be provided to an end-user (e.g., customer client). For example, the system ranks candidate items, and the role of the expert is to select an assortment of items that the end-user will like. In order to aid the judgement of the human expert, the human expert can select among options aided by a machine learning model's assessment of outcomes (e.g., model's expected outcomes). For example, this expected outcome prediction model is trained (e.g., using past observed outcomes of actions/responses by end-users) to estimate the probability a particular end-user will like (e.g., purchase) a given item if an expert decides to select it for the end-user. This is a useful framing; the system can observe what happens to items that experts select, but not the counterfactual for items they don't select. However, the results of this outcome trained model alone may lead to suggested recommendations that are not optimal. In a clothing selection example, the expected outcome machine learning model may assign a high score to shorts during the dead of winter, meaning that shorts are likely to be successful if an expert chooses to send them, which they won't do without a very good reason (e.g., like a customer requesting them for a tropical cruise).

Rather than modeling the end-user outcome, another type of machine learning model can model expert judgement to mimic the expert. For example, this model can be trained using previous item selections by experts to predict items likely to be selected by an expert for different types of clients. However, expert selections may exhibit selection bias that can lead to results that are not optimal. For example, an expert may be biased on selecting an item for a wide variety of end-users due to it being great for a small selective number of end-users that the expert incorrectly believes applies to a larger set of end-users. However, this bias can be mitigated by augmenting the expert judgement trained model with the end-user outcome trained model.

In some embodiments, an expert is provided with a ranked list of candidate items for a specific end-user that has been ranked using both the expert judgement prediction model and the expected outcome prediction model. The expert is then able to select and curate items from the ranked list for the end-user, allowing the expert to save time and effort of having to manually browse every possible item without any guidance. For example, the expert user is an expert stylist and the end-user is a client to be styled, and the stylist selects clothing items best suited for the client, and the selected items are to be provided to the end-user. The list of candidate items have been automatically chosen from a larger inventory of items using one or more machine learning algorithms. For example, the expected outcome prediction model and/or the expert judgement prediction model is utilized to provide the list of candidate items automatically selected for the end-user. A selection of one or more items in the list of candidate items to include in an item group set for the end-user is received from the expert. For example, the expert selects one or more items from the list of candidate items that the expert believes would best suit the end-user.

However, these selected items may not be all of the items to be included in the item group set. For example, the end-user is to be provided a certain number of items and the expert has chosen only a portion of the items to be included in the item group set. In order to make the selection process more efficient, the rest of the items to be included in the item group set are automatically selected. For example, potential additional items to be included in the item group set are automatically evaluated based at least in part on the expert judgement prediction machine learning model. Items in the group set are to be selected as a cohesive set where items already in the group set influence which additional items are included in the group set (e.g., contextual set analysis). Thus the expert judgement prediction machine learning model has been trained to predict based at least in part on the items already in the item group set, likelihoods of other items being selected by an expert. Based on this evaluation, one or more additional items are automatically selected for inclusion to complete the group set. The items in the group set are indicated. For example, items in the group set are visually displayed to the expert and the expert is able to finalize the group set by approving it or swapping one or more items in the group set with another item that the expert believes is a better match for the end-user (e.g., list of candidate replacement items automatically generated using the one or more machine learning models).

In some embodiments, the automatic recommendation system performs contextual set selection analysis. Unlike general recommendation problems, coherence of a group of items selected for an end-user is important in contextual set selection. For example, if an expert stylist has already selected a pair of jeans, they are less likely to want a second pair of jeans and more likely to want a blouse that pairs well with the jeans they already picked out. It is also pervasive; humans are good at taking in a holistic gestalt and hardly even noticing the relationships being considered. To successfully model human selection, these interactions are accounted for in the automatic recommendation. Similar constraints exist in other areas, particularly market basket analysis (e.g., a supermarket customer buying bread might also want butter, while an online shopper looking at printers might also want ink).

A challenge of training and building a machine learning model to perform contextual set selection is the space of possible sets is incredibly large and sparse compared to the observed sets. Considering all possible permutations and combinations among tens of thousands of items is computationally intensive and may be infeasible to perform with limited computer resources. Additionally, unlike other recommendation problems, every particular set is extremely unlikely to ever be observed for machine learning training to be effective. Thus, the machine learning model will need to contend with this intrinsic sparsity.

In some embodiments, to reduce computational complexity, the set of selection probabilities is decomposed as a product of conditional probabilities (e.g., $P(ABC)=P(A) P(B|A) P(C|AB)$). By considering only a single item at a time, the combinatorial explosion of the full joint selection space is avoided, at the cost of needing to model conditional context of varying size.

Even with the conditional probability simplification, the number of possible items may be too large to learn interactions directly. In some embodiments, latent item representations also allow further reduction of the number of free parameters in the model. Learning a latent representation for each item allows modeling of interactions between low-dimensional dense vectors rather than high-dimensional sparse vectors. Thus for example in some embodiments, the pooled set representation and contextual features are combined with two neural network hidden layers, providing a nonlinear transformation to an output layer with the same dimensionality as the item embeddings. Final estimated selection probabilities can then be taken as the softmax of the output layer with the items in inventory.

FIG. 1 is a flowchart illustrating an embodiment of a process for recommending and providing items. In some embodiments, at least some of the items selected and provided to the customer may be products identified and/or allocated to an end-user (e.g., customer) according to the processes described herein. The process of FIG. 1 may be performed using computer system 200 by processor 201 of FIG. 2 and/or may be at least in part implemented on one or more components of system 300 shown in FIG. 3. Using the process of FIG. 1, an item can be suggested and provided to an end-user based at least on the customer's properties, style preferences, product inventory, and expert (e.g., stylist) selection.

At 101, a request to enroll is received. The request to enroll may be received from a potential end-user requesting item recommendations. The end-user may be enrolled with an item selection and distribution system such as the system of FIG. 3. Upon enrollment, the end-user becomes a customer and information about the end-user may be requested and stored. Items/products may be provided to the end-user once or on a recurring/subscription basis. Items may be selected for the end-user based on the user properties and preferences, including the style and sizing profile, which may be learned over time using machine learning. In some embodiments, the items selected for the end-user may be items which are products designed with the assistance of artificial intelligence/machine learning to modify an existing base option/product to optimize an optimization goal. As part of the enrollment, the end-user may provide information about his or her preferences. For example, the customer may provide information directly or indirectly in response to provided information requests. In some embodiments, the information is provided through an application, or third party styling or messaging platforms. This information may be stored in a database such as feedback profile data store 301 or sizing profile data store 303 of FIG. 3.

At 103, end-user attributes are determined. For example, customer attributes may include objective attributes such as biographical information and sizing measurements. End-user attributes may include subjective attributes such as preferences for style, fit, colors, designers/brands, budget, etc. For example, a customer may rate specific styles, prints, and/or attributes including those products in an inventory and products from other providers. A customer's attributes may include sizing attributes such as the customer's sizes, measurements, fit challenges, and/or fit preferences. The information may be collected through third party apps or platforms such as apps that allow a user to indicate interests and/or share interests in products with other users. End-user attributes may be collected when an end-user enrolls with the system. For example, a customer may complete a survey about his or her measurements (e.g., height, weight, etc.), lifestyle, and preferences. This information may be stored to a customer profile. Customer sizing feedback may be stored in a feedback data store such as feedback profile data store 301 of FIG. 3. Customer attributes may be determined from social media and content created or curated by the customer on third party platforms.

When the customer makes purchases and provides feedback on products, end-user attributes may be updated. For example, the customer profile and feedback may be updated. The end-user may provide feedback in various formats including completing surveys, writing product reviews, making social media posts, and the like regarding one or more products. Products recommended to the customer may be adapted to a customer's changing attributes and taste. In one aspect, the end-user's taste may be learned over time by training and retraining a machine learning model using end-user feedback. End-users may also provide sizing feedback. For example, an item may fit too large, too small, or perfectly. As another example, an item may have sleeves that are too long. In one aspect, the end-user's sizing may be learned over time by training and retraining a machine learning model using end-user feedback.

In various embodiments, end-user attributes may be determined based on generalizations about other users who share characteristics with a particular end-user. Generalizations about groups of end-users may be made from individual end-user attributes. End-users may be grouped by any characteristic, including gender, body type, shared preference (e.g., a measure of similarity between end-users such as end-user objective, subjective, and/or sizing attributes or learned similarity in product preferences), and the like.

At 105, candidate items among an inventory of items are automatically recommended using one or more machine learning models. For example, items in an inventory of items are scored and ranked for recommendation for an end-user. The item recommendations may be provided to an expert (e.g., stylists). In various embodiments, instead of directly offering all possible items options to the expert, the expert user is provided a sorted subset that the machine learning models have determined for the specific end-user. For example, an expert is provided with a ranked list of candidate items for an end-user that has been ranked using both the expert judgement prediction model and the expected outcome prediction model. The expert is then able to select and curate items from the ranked list for the end-user, allowing the expert to save time and effort of having to manually browse every possible item without any guidance. For example, the expert user is an expert stylist and the end-user is a client to be styled, and the stylist selects clothing items best suited for the client and the selected items are to be provided to the end-user. The list of candidate items has been automatically chosen from a larger inventory of items using one or more machine learning algorithms For example, the end-user outcome trained model and/or the expert judgement trained model is utilized to provide the list of candidate items automatically selected for the end-user.

In various embodiments, the items are recommended/ranked based on global attributes/constraints. For example, a particular product in inventory can only be allocated to one customer. Using global attributes/constraints, the product options for a particular customer take into account whether this customer should be matched with the product instead of other customers. In some embodiments, each customer should be allocated at least a minimum number of products. For example, each customer should have at least five product recommendations. In some embodiments, the global constraints may require a minimum number of product types to be included in product recommendations for each customer. For example, each customer should receive recommendations that include a variety of product types such as a mix of shirts, pants, sweaters, jewelry, etc. In some embodiments, the inventory used is based on the current and/or future inventory. In some embodiments, the inventory is a threshold time period that covers a weekend and/or a period of time where the inventory is not restocked. For example, the inventory threshold time period may be configured to cover until the next expected restocking or processing of returns for the inventory.

One or more machine learning models are utilized to automatically recommend (e.g., sorted based on recommendation) the item candidates. One type of one or more machine learning model that are utilized is an expected outcome prediction model. For example, an expected outcome prediction model is trained (e.g., using past observed outcomes of items provided to end-users) to predict the probability a particular end-user will like, retain, and/or purchase a given item if an expert decides to select it for the end-user. For example, one or more models, such as sales model(s), inventory model(s), variety model(s), rating model(s), predicted size fit model(s), etc. are used. As an example, each trained model may receive as input a feature or combination of features and predict/score a performance metric such as a sales metric, inventory metric, variety metric, style rating, size rating, fit rating, quality rating, retention, personalization, style grouping, and/or price value rating.

In various embodiments, a plurality of models are trained and each model corresponds to a respective performance metric. For example, a sales model is trained to determine a sales metric, an inventory model is trained to determine an inventory metric, and rating models may be used to determine a style rating, a size rating, a fit rating, a quality rating, a retention score, a personalization score, a style grouping rating, and a price value rating, among others. The models may be trained with training data sets, where the training data sets correspond to particular categories and segments. In various embodiments, a match score model is trained to determine a match score metric, such as the match score used to determine product options.

Another type of one or more machine learning models that are utilized is an expert judgement prediction model. Rather than just modeling the end-user outcome, the expert judgement model mimics selection decisions of the human expert. For example, this model can be trained using previous item selections by experts to predict items likely to be selected by an expert for different types of end-users. The expert judgement prediction model may be used along with the expected outcome prediction model to select the recommended item candidates. For example, for each item available to be selected, an overall score (e.g., weighted combination) of an expected outcome prediction model score and an expert judgement prediction model score is determined, and the items with the top overall scores are determined as the most recommended items.

At 107, expert selections of one or more items among the candidate item recommendations are received. For example, a human expert (e.g., a stylist) selects one or more items for an end-user among the automatically recommended items in 105. The selected items are to be provided (e.g., shipped) to the end-user. For example, one or more blouses may be automatically selected from the inventory based on the customer's attributes. Instead of providing the blouses directly to a customer, a stylist selects a sub-set of blouses to offer to the customer. Statistics about the product selection such as whether an item was selected to be part of the product selection, when the item was selected to be part of the product selection, for who/what type of customer was the item selected, etc. can be stored. In various embodiments, the stylist may rely on the predicted size fit to select items that are predicted to fit the customer well. Similarly, the stylist may rely on the predicted size fit to exclude items from being selected that are predicted to fit poorly.

In various embodiments, a human expert stylist is informed of the product options with the addition of purchase metrics such as a likelihood to purchase or desirability prediction metric. For example, the likelihood to purchase metric incorporates a predicted size metric and may incorporate other metrics such as a sales metric, an inventory metric, and metrics based on style, quality, retention, personalization, style grouping, price value, etc. A human stylist may use the overall likelihood to purchase or desirability prediction metric to inform the stylist's selection of products for a customer. By ranking potential options using the determined metrics and providing inferred purchase information for each of the product options, a stylist is able to make a more informed selection for her or his customer. The stylist can incorporate her or his human expertise on style, sizing, fit, etc. with quantified purchasing metrics determined using artificial intelligence and machine learning. The final product selection is influenced both by the uniquely human qualities of the stylist, such as the stylist's expertise and the stylist's relationship and understanding of the customer, as well as data science based on past purchase decisions and feedback of collective customers.

In some embodiments, a group set of items is to be provided to the end-user. The expert may select a subset of the group set and other items to complete the group set are to be automatically determined based on what has been already selected to be included in the group set. For example, a selection of one or more items in a list of recommended candidate items to include in a selected item group set for the end-user is received from the expert. The expert selects one or more items from the list of recommended candidate items that the expert believes would best suit the end-user. However, these selected items may not be all of the items to be included in the item group set. For example, the end-user is to be provided a certain number of items and the expert has chosen only a portion of the items to be included in the item group set. In order to make the selection process more efficient, the rest of the items to be included in the item group set are automatically selected. For example, potential additional items to include in the item group set are automatically evaluated based at least in part on the expected outcome prediction model and/or the expert judgement prediction machine learning model. Items in the group set are to be selected as a cohesive set where items already in the group set influence which additional items are included in the group set (e.g., contextual set analysis). Thus the expert judgement prediction machine learning model has been trained to predict based at least in part on the items already in the item group set, likelihoods of other items being selected by an expert. Based on this evaluation, one or more additional items are automatically selected for inclusion to complete the group set.

The items in the group set are indicated. For example, items in the group set are visually displayed to the expert and the expert is able to finalize the group set by approving it or swapping one or more items in the group set with another item that the expert believes is a better match for the end-user (e.g., list of candidate replacement items automatically generated using one or more machine learning models). In some embodiments, the automatic recommendation system performs contextual set selection analysis. Unlike general recommendation problems, coherence of a group of items selected for an end-user is important in contextual set selection. Once the group set has been approved by the expert, the information of the group set selection is used to further train/retrain the expert judgment prediction model for use in determining future item recommendations.

At 109, selected items are provided to the end-user. For example, a shipment of items may be provided to a customer. The customer may then decide to keep or return one or more of the items in the shipment. In some embodiments, in the event the customer decides to retain an item, then the customer purchases the item. Statistics about the items such as whether they were kept or returned, when they were kept or returned, and/or who/what type of end-user kept or returned the item, among others can be stored.

At 111, feedback about the provided items is received. For example, an end-user customer may provide feedback about the product selection such as reasons why the customer is keeping or not keeping one or more items in the product selection. In various embodiments, a customer provides sizing feedback and style feedback on the product selection provided in 109. For example, the customer may provide feedback indicating a blouse is too loose or too tight in the chest. As another example, a customer may provide feedback that a pair of jeans fits perfectly. Feedback may be provided using a coarse granularity such as too large, too small, or fits perfectly. Feedback may also be provided using a finer granularity such as the thigh opening is too tight or the sleeves are too short by two inches. The feedback may be provided by the customer in various formats including completing surveys, writing product reviews, making social media posts, and the like. In various embodiments, the feedback may be used to train/retrain expected outcome models for use in determining future item recommendations.

At 113, information about the item selection and/or feedback is stored. For example, sizing information may be stored in a database such as feedback profile data store 301 or sizing profile data store 303 of FIG. 3. In some embodiments, the information stored includes style feedback, fit challenges, and/or fit preferences of the end-user. The information about an end-user style preference, sizing, and/or a product item's sizing may be extracted to learn and predict over time by a computer system and/or a stylist the product items for an end-user and/or group of end-users. In some embodiments, the stored information is used to train one or more expected outcome models and/or expert judgment machine learning models.

Figure 2:
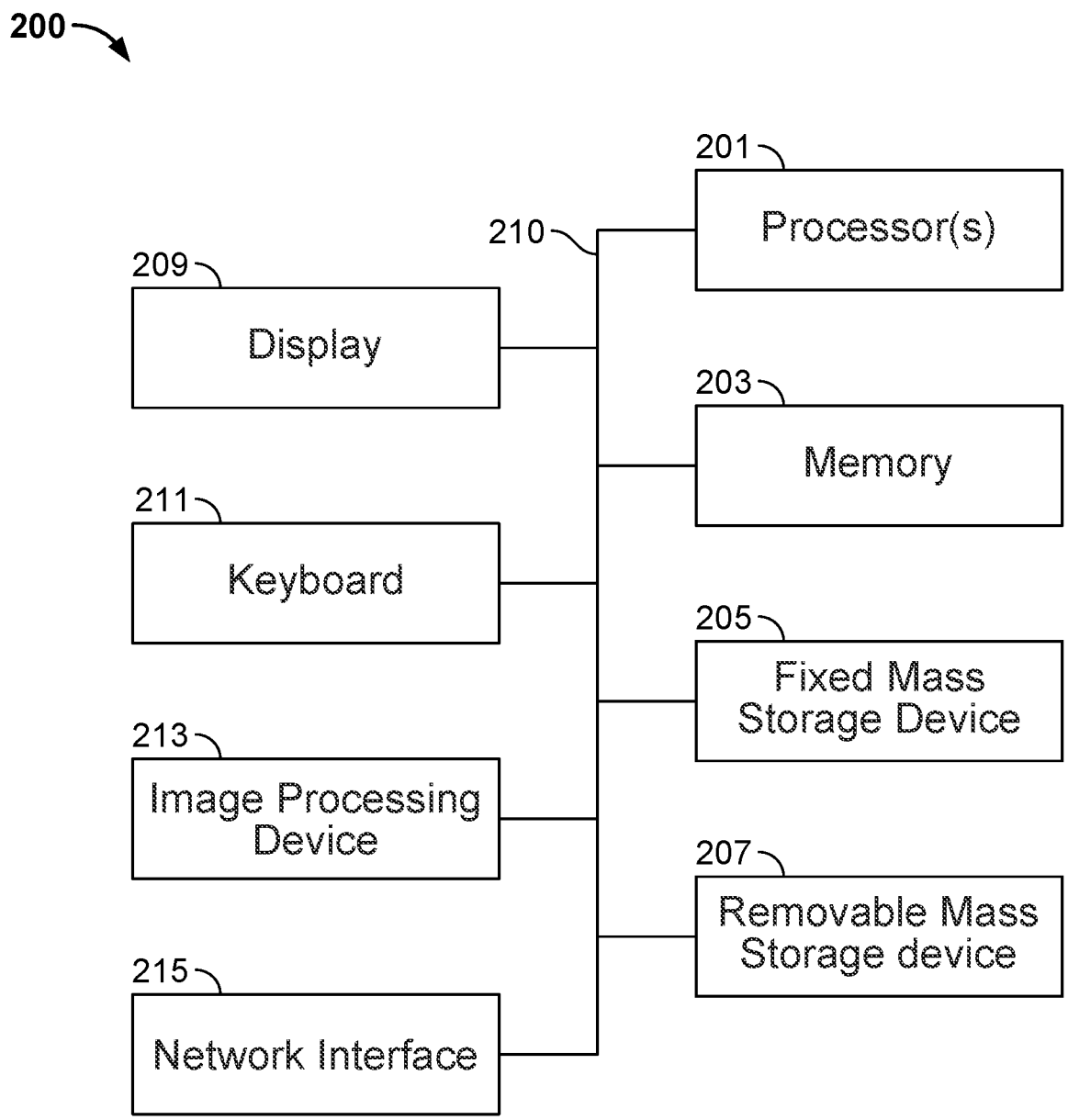
FIG. 2 is a functional diagram illustrating a programmed computer system for determining an item recommendation in accordance with some embodiments.

FIG. 2 is a functional diagram illustrating a programmed computer system for determining an item recommendation in accordance with some embodiments. As will be apparent, other computer system architectures and configurations can be used to perform the described product generation technique. Computer system 200, which includes various subsystems as described below, includes at least one microprocessor subsystem (also referred to as a processor or a central processing unit (CPU) 201). In some embodiments, computer system 200 is a virtualized computer system providing the functionality of a physical computer system. For example, processor 201 can be implemented by a single-chip processor or by multiple processors. In some embodiments, processor 201 is a general purpose digital processor that controls the operation of the computer system 200. In some embodiments, processor 201 also includes one or more coprocessors or special purpose processors (e.g., a graphics processor, a network processor, etc.). Using instructions retrieved from memory 203, processor 201 controls the reception and manipulation of input data received on an input device (e.g., keyboard 211, image processing device 213, etc.), and the output and display of data on output devices (e.g., display 209).

In some embodiments, processor 201 is used to optimize product suggestions for a group of customers. The optimized selection results may be used as product options for one or more stylists for determining product selections for a group of customers. In various embodiments, the optimized selection results may be used to inform product design, manufacturing, and/or purchasing decisions. In some embodiments, processor 201 is used to train a machine learning model for determining match score metrics between a customer and a product. Once trained, processor 201 may be utilized to determine a match score value for each customer and each inventory product using the trained machine learning model. In various embodiments, the match score metrics correspond to desirability prediction values.

In some embodiments, processor 201 includes and/or is used to provide elements 101, 103, 105, 107, 109, 111, and/or 113 with respect to FIG. 1. In some embodiments, processor 201 is used to communicate with or provide the functionality of data stores 301 and 303 and inventory interface 305 of FIG. 3. In some embodiments, processor 201 is utilized by the elements 307, 309, 311, and 313 of FIG. 3. In some embodiments, processor 201 performs the processes described below with respect to FIGS. 4-5.

Processor 201 is coupled bi-directionally with memory 203, which can include, for example, one or more random access memories (RAM) and/or one or more read-only memories (ROM). As is well known in the art, memory 203 can be used as a general storage area, a temporary (e.g., scratch pad) memory, and/or a cache memory. Memory 203 can also be used to store input data and processed data, as well as to store programming instructions and data, in the form of data objects and text objects, in addition to other data and instructions for processes operating on processor 201. Also as is well known in the art, memory 203 typically includes basic operating instructions, program code, data, and objects used by the processor 201 to perform its functions (e.g., programmed instructions). For example, memory 203 can include any suitable computer readable storage media described below, depending on whether, for example, data access needs to be bi-directional or uni-directional. For example, processor 201 can also directly and very rapidly retrieve and store frequently needed data in a cache memory included in memory 203.

A removable mass storage device 207 provides additional data storage capacity for the computer system 200, and is optionally coupled either bi-directionally (read/write) or uni-directionally (read only) to processor 201. A fixed mass storage 205 can also, for example, provide additional data storage capacity. For example, storage devices 205 and/or 207 can include computer readable media such as magnetic tape, flash memory, PC-CARDS, portable mass storage devices such as hard drives (e.g., magnetic, optical, or solid state drives), holographic storage devices, and other storage devices. Mass storages 205 and/or 207 generally store additional programming instructions, data, and the like that typically are not in active use by the processor 201. It will be appreciated that the information retained within mass storages 205 and 207 can be incorporated, if needed, in standard fashion as part of memory 203 (e.g., RAM) as virtual memory.

In addition to providing processor 201 access to storage subsystems, bus 210 can be used to provide access to other subsystems and devices as well. As shown, these can include a display 209, a network interface 215, an input/output (I/O) device interface 211, an image processing device 213, as well as other subsystems and devices. For example, image processing device 213 can include a camera, a scanner, etc.; I/O device interface 211 can include a device interface for interacting with a touchscreen (e.g., a capacitive touch sensitive screen that supports gesture interpretation), a microphone, a sound card, a speaker, a keyboard, a pointing device (e.g., a mouse, a stylus, a human finger), a Global Positioning System (GPS) receiver, an accelerometer, and/or any other appropriate device interface for interacting with system 200. Multiple I/O device interfaces can be used in conjunction with computer system 200. The I/O device interface can include general and customized interfaces that allow the processor 201 to send and, more typically, receive data from other devices such as keyboards, pointing devices, microphones, touchscreens, transducer card readers, tape readers, voice or handwriting recognizers, biometrics readers, cameras, portable mass storage devices, and other computers.

The network interface 215 allows processor 201 to be coupled to another computer, computer network, or telecommunications network using a network connection as shown. For example, through the network interface 215, the processor 201 can receive information (e.g., data objects or program instructions) from another network, or output information to another network in the course of performing method/process steps. Information, often represented as a sequence of instructions to be executed on a processor, can be received from and outputted to another network. An interface card or similar device and appropriate software implemented by (e.g., executed/performed on) processor 201 can be used to connect the computer system 200 to an external network and transfer data according to standard protocols. For example, various process embodiments disclosed herein can be executed on processor 201, or can be performed across a network such as the Internet, intranet networks, or local area networks, in conjunction with a remote processor that shares a portion of the processing. Additional mass storage devices (not shown) can also be connected to processor 201 through network interface 215.

In addition, various embodiments disclosed herein further relate to computer storage products with a computer readable medium that includes program code for performing various computer-implemented operations. The computer readable medium includes any data storage device that can store data which can thereafter be read by a computer system. Examples of computer readable media include, but are not limited to: magnetic media such as disks and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code as produced, for example, by a compiler, or files containing higher level code (e.g., script) that can be executed using an interpreter.

The computer system shown in FIG. 2 is but an example of a computer system suitable for use with the various embodiments disclosed herein. Other computer systems suitable for such use can include additional or fewer subsystems. In some computer systems, subsystems can share components (e.g., for touchscreen-based devices such as smart phones, tablets, etc., I/O device interface 211 and display 209 share the touch sensitive screen component, which both detects user inputs and displays outputs to the user). In addition, bus 210 is illustrative of any interconnection scheme serving to link the subsystems. Other computer architectures having different configurations of subsystems can also be utilized.

Figure 3:
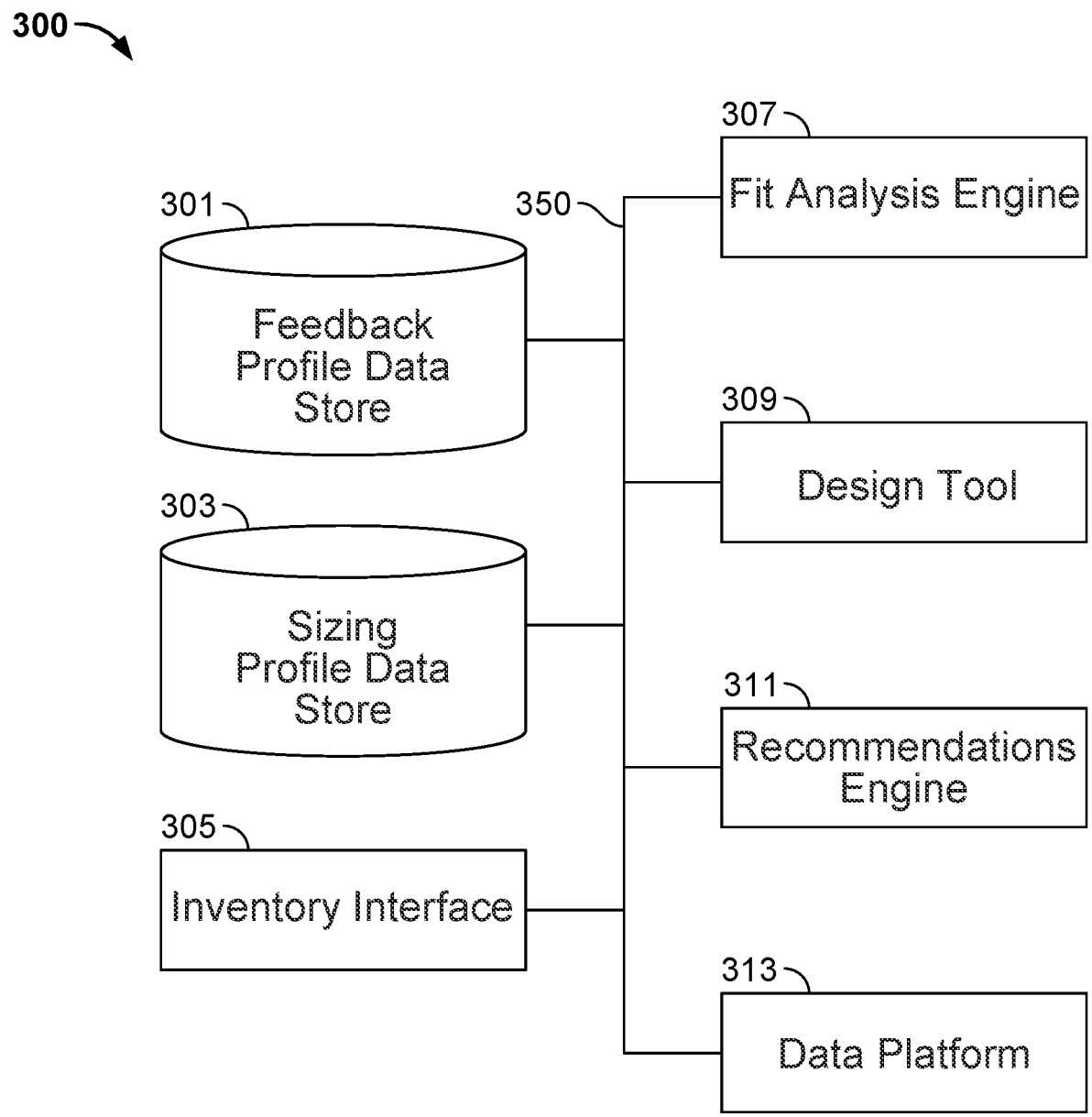
FIG. 3 is a block diagram illustrating an embodiment of a system for item recommendation.

FIG. 3 is a block diagram illustrating an embodiment of a system for item recommendation. The example system 300 shown in FIG. 3 includes feedback profile data store 301, sizing profile data store 303, inventory interface 305, fit analysis engine 307, design tool 309, recommendations engine 311, and data platform 313. Each of these components may be communicatively coupled via network 350. In some embodiments, system 300 is used to perform at least a portion of the processes described with respect to FIGS. 1 and 4-5.

In the example shown, feedback profile data store 301 and sizing profile data store 303 may be configured to store information about customers, products, sales data, performance metrics, and machine learning models. In some embodiments, feedback profile data store 301 may be utilized for storing feedback from users or customers related to products and sizing profile data store 303 may be utilized for storing sizing profile data regarding different garment products. In some embodiments, feedback profile data store 301 and sizing profile data store 303 may exist as a single unified data store or spread across multiple data stores.

In some embodiments, the feedback profile data store 301 stores information including customer or user feedback on size, fit rating, quality, print/style, and price for any test fitted garment. In some embodiments, the feedback includes feedback from a stylist, designer, and/or supplier. In some embodiments, the feedback includes user size measurements, fit challenges, and fit preferences. In various embodiments, the feedback includes a corresponding reference to a garment with sizing profile information in the sizing profile data store. In some embodiments, a garment is referenced using a garment identifier or a stock keeping unit (SKU). Information in the feedback data store about an item may be stored with statistics such as a sales metric (e.g., statistics related to sales of an item or group of items), an inventory metric (e.g., statistics related to inventory such as number of units in inventory), variety (e.g., a measure of diversity of inventory and related information such as addressable market), etc.

In some embodiments, sizing profile data store 303 stores sizing profile information including data associated with a product or group of products. In some embodiments, sizing profile information is categorized by a product silhouette category. A product silhouette category may be used to define a unique category of garments, such as sport coats, long sleeve tops, short sleeve tops, three-quarter sleeve tops, pull over tops, sleeveless tops, shorts, and jeans, among others. In some embodiments, the garment shape as well as material or construction additionally define a garment silhouette. Examples of material and/or construction include woven, knit, and denim, among others. For each garment, sizing profile information includes measurements for the garment for each garment size. In some embodiments, measurements are taken based on the garment silhouette category and different silhouette categories include different measurements. For example, measurements for a pant silhouette may include a waist, inseam, thigh, front leg opening, and back leg opening measurement, among others. In contrast, measurements for a short sleeve knit top may include a neck opening, shoulder-to-shoulder, chest, sleeve length from armhole, and bicep measurement, among others. Sizing profile information may also include product information such as objective attributes of the product such as a stock keeping unit (SKU), item type, item property (e.g., color, pattern, material), etc. Product information may include subjective attributes of the product such as suitability for body types, season, etc. Product attributes may be identified by a human or by a machine. Product information may include a representation of the product such as text, an image, a video, or other form of data.

The inventory interface 305 may be configured to store and retrieve inventory information from one or more inventory data stores. In some embodiments, the inventory interface is an interface to one or more local or remote inventory data stores. For example, using the inventory interface, inventory information may be retrieved and/or updated via a vendor hosting one or more inventory data stores remotely. In some embodiments, an inventory data store includes one or more first-party inventory systems hosted either locally or remotely. In some embodiments, inventory data stores may be structured based on warehouses such that each warehouse has a corresponding inventory data store. In some embodiments, different inventory data stores utilize different interfaces, such as different application programming interfaces or query languages. The inventory interface translates inventory requests and updates to and from the components of FIG. 3 using the appropriate inventory data store interface. In various embodiments, inventory information may include garment or product inventory information including a stock keeping unit (SKU), an item type, an item property (e.g., color, pattern, material), a silhouette category, quantity for each product, as well as historical information along with other similar appropriate inventory information.

In various embodiments, the inventory interface is used to access information about how many units of each item are in the inventory. Supply chain information such as how many units of an item have been ordered, when they are expected to be received to replenish a stock of the item, etc. may be accessed via the inventory interface.

The fit analysis engine 307 determines fit analysis for garments by utilizing data from feedback profile data store 301 and sizing profile data store 303. For example, fit analysis engine 307 may be utilized to determine the values for variable size components for a particular garment. In some embodiments, fit analysis engine 307 utilizes data platform 313 to retrieve and/or update data related to feedback, sizing, and/or inventory. Fit analysis engine 307 utilizes data platform 313 to retrieve feedback on sizing from customers and the sizing profile of the garment and/or related garments to determine the applicable variable size components. In some embodiments, fit analysis engine 307 may further utilize data platform 313 to determine the inventory status of one or more garments. For example, when performing fit analysis, fit analysis engine 307 may utilize inventory information, including historical inventory information, to determine the appropriate variable size components.

The design tool 309 may be configured to employ adaptive machine learning to help a designer design garments for the customers according to the customers' tastes. The designed items may be a hybrid of a base garment sized up or down based on variable size components. The design tool 309 may be configured to execute the processes described herein to design a product, where the product incorporates a predicted size fit satisfaction, as further described herein. For example, a designer may use the design tool 309 to create a new garment from a base garment. The selection of one or more values for variable size components may be based on an optimization goal such as increasing the size fit satisfaction. Thus, the garment may be a result of a combination of machine learning/artificial intelligence selected variable size components, where the variable size components are automatically determined to be among the best measurements to meet an optimization goal. For example, values for the variable size components may be ranked according to how well each meets the size fit satisfaction goal.

For example, to at least in part automatically design a product, a system aggregates data collected from a customer, stylist, and/or designer and measurement data from garments. Data platform 313 may build one or more trained models using machine learning processes further described herein. The training data to train the models may be based on behavior and/or feedback of the customer, stylist, and/or the designer as stored over time in the feedback data store, sizing profile information related to garments as stored in the sizing profile data store, and/or an inventory database accessible via the inventory interface. When a designer selects a base garment, one or more sizing goals are selected via the design tool. The fit analysis engine is used to determine values for the variable size components of the base garment to accomplish the sizing goals. The determined variable size components are presented via the design tool to the designer.

In some embodiments, the designer may choose to size up or down the garment. As another example, the designer may choose to size the base garment to another canonical size from a base canonical size. A canonical base size of medium may be used to scale a garment to an extra-small, small, large, extra-large, etc. As another example, the designer may choose to scale a canonical base size to a size variation of the base size within the same canonical size, such as from a medium to a medium-short and/or a medium-tall. As another example, the designer may choose to scale a base garment to a selection of users, such as a cluster of users. The designer specifies the user or group of users as the target audience instead of specifying a size.

In various embodiments, an alternative size for a variable size component may be determined based at least in part on collaborative filtering and/or client segmentation. For example, an alternative size for a component may be selected based on a likelihood that a size would fall into a cluster (e.g., an addressable market). To determine whether a garment with determined size components would fall into a cluster, a set of features making up the garment may be analyzed to determine whether the set would cause the garment to meet a size fit satisfaction goal (e.g., whether it would be an optimal result to fit analysis). The cluster may be based on feedback such as sizing feedback from the user and sizing measurements obtained from the user's garments.

The recommendations engine 311 may be configured to employ adaptive machine learning to provide recommendations to experts (e.g., stylists) who select and approve items to be provided to end-users (customers) from an item inventory. For example, the system may use a machine learning trained model to score products. The top scoring products may be provided to the stylist. The stylist (e.g., a human) then selects one or more of the top scoring products to be offered to a customer. The customer may purchase/keep the product and/or provide feedback about the product. The feedback may be used to improve the machine learning training models and may be stored in feedback profile data store 301. In some embodiments, a group of items is to be provided for an end-user and the expert selects a portion of items to be included in the group of items among recommended items automatically scored using one or more machine learning models. Other items to be included in the group depend on what other items have been already included in the group and can be automatically selected using one or more machine learning models. An expected outcome machine learning model (e.g., trained to predict end-user preference) and/or an expert judgement machine learning model (e.g., trained to predict what an expert would select) may be used to automatically select the items to be included in the group of items to be provided to the end-user.

In various embodiments, recommendations engine 311 provides recommendations based on global optimization results. For example, recommendations engine 311 determines recommendations by taking into account the best allocation of inventory as product suggestions based on the preferences of an entire group of customers rather than only considering the preferences of a single customer of the group. This global optimization of product suggestions results in a better overall customer satisfaction across the entire group of customers. In various embodiments, recommendations engine 311 takes into account global constraints when determining product recommendations.

The data platform 313 may be configured to coordinate operation of feedback profile data store 301, sizing profile data store 303, inventory interface 305, fit analysis engine 307, design tool 309, and recommendations engine 311. For example, when data is generated by interaction of a customer, stylist, designer, and/or supplier with system 300, the data platform 313 may determine what information is to be stored and where. For example, data platform 313 may store the feedback data in feedback profile data store 301 and sizing profile data in sizing profile data store 303. The data platform 313 may also store the data as part of a training data set for machine learning as further described herein. As another example, when measurement data is received for different garments, data platform 313 may store the measurement data as a sizing profile in sizing profile data store 303. As a further example, data platform 313 may determine to store inventory related data using inventory interface 305.

For example, in the event the inventory count for a particular garment needs to be retrieved, data platform 313 may determine that inventory interface 305 is the appropriate component from which to retrieve the information. Data platform 313 may direct the request for inventory updates to inventory interface 305. In various embodiments, data platform 313 may be communicatively coupled to feedback profile data store 301, sizing profile data store 303, inventory interface 305, fit analysis engine 307, design tool 309, and recommendations engine 311.

Machine learning models may include trained models generated from a machine learning process. Trained models may be categorized by type such as feedback models, sizing profile models, inventory models, variety models, etc. For each category of model, a model may be generated for each of one or more segments such as segments based on one or more of the following: a garment silhouette, target body type, a target seasonality, a target fiscal quarter, a target customer type or business line (e.g., women, men, children, petite, plus, maternity), a target lifestyle, a target product type (e.g., blouse, dress, pants), a target style (e.g., edgy, urban, Pacific Northwest), etc. A model may correspond to a particular segment such as a client segment, time period, etc. For example, a first model may be for the sales performance of a product for a group of customers with a first body type such as petite and a second model may be for the performance of a product for a group of customers with a second body type such as tall.

In one aspect, the variety model may be used to identify the value of variety in the inventory even where exactly whom the style is for is typically not identifiable. The variety model may measure a product in terms of the product globally filling a need. The variety model may help expand the total addressable market. That is, even if a product does not perform well with a current customer, the product may perform well with potential/future customers. In another aspect, a customer may prefer having more color choices even if he or she tends to purchase only one color. The customer might like the increased possibility that he or she is purchasing a unique blouse in his or her color because the blouse is offered in many color choices. The variety model may be trained using higher level indications of desired distribution of inventory variety. For example, machine learning training may have to be utilized to determine a higher level model for ideal inventory distribution based on higher level product categories, and the variety model is trained using this higher level model to determine a model for ideal inventory distribution based on product features. For example, a particular blouse style may be offered in three colors. Although one of the colors may not sell as well as the other two colors, providing the third color as an option may represent value in the inventory.

In various embodiments, other models may be utilized. Example models include models for style rating, size rating, fit rating, quality rating, retention, personalization, style grouping, and price value rating as further described herein with respect to FIGS. 1 and 4-5. These models may be utilized in combination with feedback and sizing models to generate or recommend a garment that not only optimizes a size fit satisfaction but also other optimization goals including quality, retention, personalization, style, and price value goals. An overall match score value may be determined and used for global optimization to make a different set of merchandise available to a stylist for each customer. The suggested products are optimized for a group of customers and account for the needs of the collective group of customers, present inventory state, and future inventory state. By optimizing globally, the overall customer satisfaction is increased compared to optimizing locally by considering only each particular customer's preferences at a particular moment in time with the current inventory.

In some embodiments, feedback profile data store 301, sizing profile data store 303, inventory interface 305, fit analysis engine 307, design tool 309, recommendations engine 311, and data platform 313 may be configured to perform the processes described herein.

Figure 4:
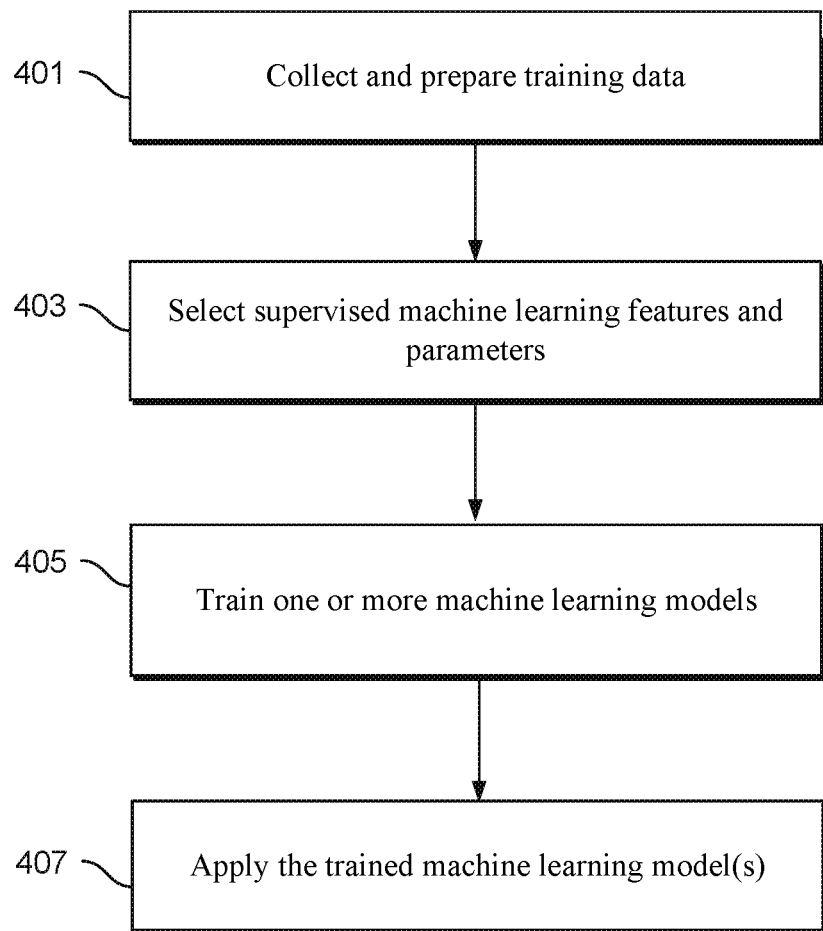
FIG. 4 is a flowchart illustrating an embodiment of a process for training one or more machine learning prediction models.

FIG. 4 is a flowchart illustrating an embodiment of a process for training one or more machine learning prediction models. The process of FIG. 4 may be at least in part implemented on one or more components of system 300 shown in FIG. 3. In some embodiments, the process of FIG. 4 is performed by processor 201 of FIG. 2. The process of FIG. 4 may be used to train one or more expected outcome prediction models (e.g., model predicting an expected outcome by an end-user for a provided item) and/or one or more expert judgement prediction models (e.g., model predicting what a human expert will select for an end-user). The process of FIG. 4 may be continually and/or periodically performed to update/retain machine learning models.

At 401, training data is collected and prepared. In some embodiments, training data includes end-user attributes (e.g., information about the end-user, including age, size, sex, demographic, geographical location, style preference, etc.), item group sets previously provided to end-users, item group sets selected/approved by experts, past purchase data (e.g., which previously provided items were retained/purchased by end-user), item rating data, other feedback data (e.g., sizing feedback data), and any other information associated with end-users, items, and/or expert selections/feedback. The training data may be collected during end-user enrollment, when a group of items are selected/approved by an expert for an end-user, and/or when an end-user approves a provided item (e.g., purchase) and/or provides feedback about a provided item.

In various embodiments, the data collected is prepared. For example, collected data is merged and prepared into a training data for a training corpus. In some embodiments, the data is prepared into a training data set and a validation set. Thus a portion of the data is utilized for training and a separate portion is utilized for validating the training results.

In some embodiments, different prediction models can be trained for different prediction model categories or segments. To train each of the different models, different sets of training data can be gathered specifically for different models to be trained.

At 403, supervised machine learning features and parameters are selected. For example, a user may set control parameters for various machine learning algorithms to be used to train a model. The selection of the features refers to the selection of machine learning features or individual identifiable properties associated with one or more of the following: an item, an item group set, an end-user attribute, an end-user preference, an end-user feedback, an expert, a past purchase, etc. The features and parameters may be selected based on objectives for the trained model. The selection of features to be utilized in prediction models can be defined at least in part by a human user or at least in part by automatically being determined. For example, a human or artificial intelligence may define features of the prediction models to be trained.

In various embodiments, the features may be based at least in part on natural language processing (NLP). For example, a computer system may extract information from text according to NLP techniques. Text generated by and about customers such as in product reviews, comment forms, social media, emails, and the like may be analyzed by an NLP system to determine customer size and fit ratings. For example, a customer may provide feedback (e.g., text) when they receive an item. The feedback provided by the customer may be processed with NLP techniques to extract features. NLP techniques include rule-based engines, clustering, and classification to make determinations about characteristics of a product that might be considered a feature. Features may be identified by machine learning or computer vision or NLP, and recommended for inclusion in a product design. In various embodiments, term frequency-inverse document frequency (TFIDF), latent Dirichlet allocation (LDA), colocation analyses, and the like can be used to create lower-dimensional representations of styles or to generate words or phrases representing styles. Various machine learning methods can then predict metrics/optimization goals using these features.

At 405, one or more machine learning models are trained. In supervised machine learning, training data may be utilized to train a prediction model to perform predictions based on information "learned" from the training data. In various embodiments, various types of machine learning models are trained.

In various embodiments, the model may be trained according to supervised learning or other machine learning techniques. In supervised learning, the objective is to determine a weight of a feature in a function that optimizes a desired result, where the function is a representation of the relationship between the features. In a training process, weights associated with features of a model are determined via the training. That is, the contribution of each feature to a predicted outcome of the combination of features is determined. In various embodiments, the model may be trained using mixed effects models that take into account several features, some of which may be non-independent. The model may be trained by ridge regression that attributes credit to a particular feature.

In some embodiments, when training a model, the attribution of each feature to the output of the function is determined. In some embodiments, a feature represents a combination of features. For example, an individual feature may have a different weighting when that feature is combined with another feature. A feature or set of features may define a base option. As more input is provided to a model, the output of the function becomes closer to a target or validation result.

In various embodiments, a model may be evaluated after the model has been trained. The error of a model is the difference between actual performance and modeled performance. In another aspect, in some situations, a well-trained model may nevertheless diverge from an actual result. In this situation, a product may have an aspect that makes the product perform better than expected. For example, the garment may perform better, such as fit better, than predicted by a trained model. The description of the factor for success is an aspect. This aspect can be leveraged by incorporating the aspect into new garments.

In some embodiments, one or more expected outcome prediction models are trained. For example, the expected outcome model predicts a likelihood a particular end-user (with certain end-user attributes) will like/purchase/retain a particular item (with certain item attributes). This model can be used to determine a recommendation score for items. This model is trained using past observed outcomes of previously provided items to end-users. For example, when an end-user receives a set of items, the end-user has the option to purchase/retain any of the items in the set of items or return/reject any of the items in the set of items as well as provide feedback about the items that were provided. The action taken by the end-user and any feedback can be used as additional training data to retrain the expected outcome prediction model to improve future item recommendations.

In some embodiments, one or more expert judgement prediction models are trained. For example, the expert judgement prediction model predicts a likelihood an expert will select an item to be included in a group set of items to be provided for a specific end-user given any items already in the group set of items. Thus, rather than modeling the end-user outcome, the expert judgement model attempts to mimic a selection by an expert. For example, for a given end-user and his/her associated attributes/properties and any items (and its attributes/properties) already included in a group set of items selected for the given end-user, the expert judgment prediction model outputs a recommendation score for each potential additional item to be included in the group set of items. Potential item(s) with the best recommendation score(s) can be selected to be included in the group set of items to be provided together. In some embodiments, this model can be trained using previous item selections by experts to predict items likely to be selected by an expert for a client with certain attributes. Every time a set of items is chosen/approved by an expert for a specific end-user, the item in the set and their attributes/properties as well as attributes/properties of the end-user can be used to train/retrain the expert judgement prediction model to improve item recommendations by the expert judgement prediction model.

In some embodiments, models may be trained by categorized type such as by garment silhouette category (e.g., knit blouse, woven dress, denim pants, etc.), target body type, target seasonality, target fiscal quarter, target customer type or business line (e.g., women, men, children), target lifestyle, target style (e.g., edgy, urban, Pacific Northwest), etc. Different client and garment segments may be used to categorize the model types depending on the optimization goal. In some embodiments, a different model for one or more model types may be generated for each of one or more segments such as segments based on one or more of the following: a gender, an age range, a target customer type or business line (e.g., women, men, children, petite, plus, maternity), etc. For example, a first model corresponds to women end-users, while another model corresponds to men end-users.

At 407, the trained machine learning model(s) are applied. For example, using the trained models, items are ranked for an end-user. The recommendations can be reviewed by an expert to select/approve for inclusion in a group of items to be provided to the end-user. In one example, a certain end-user is to be provided a group of items. Items in a catalog of items are ranked based on one or more of the trained models that output a match score. Based on the ranking, items are chosen (e.g., automatically based on the rankings or manually by an expert based on the rankings) for inclusion in the group of items.

In some embodiments, for each model type, multiple versions of the model exist. As additional data is collected and prepared, new versions of the model are trained and prepared for production use. Training with the additional data allows for a more accurate training model. In some embodiments, once a model has been validated, the model is transferred to a production system and utilized with a machine learning engine for use in predicting a match score. For example, a trained machine learning model is transferred into a machine learning engine, such as recommendations engine 311 of FIG. 3, for ranking product item options.

Figure 5:
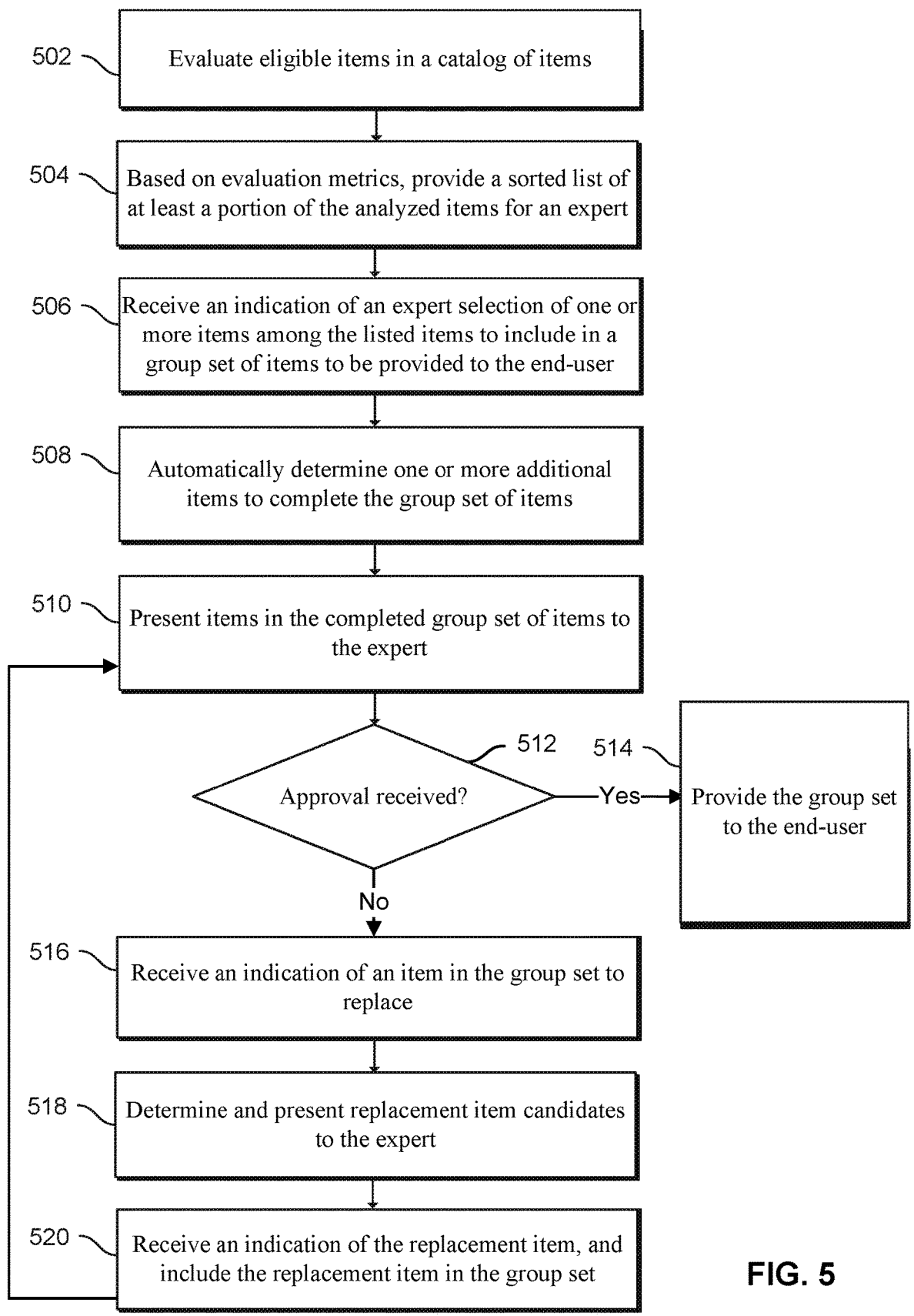
FIG. 5 is a flowchart illustrating an embodiment of a process for automatically selecting a group set of items provided to an end-user.

FIG. 5 is a flowchart illustrating an embodiment of a process for automatically selecting a group set of items provided to an end-user. The process of FIG. 5 may be at least in part implemented on one or more components of system 300 shown in FIG. 3. In some embodiments, the process of FIG. 5 is performed by processor 201 of FIG. 2. In some embodiments, at least a portion of the process of FIG. 5 is included in 105 and/or 107 of FIG. 1 and/or 407 of FIG. 4.

At 502, eligible items in a catalog of items are evaluated. For example, available items (e.g., available items ready to ship) in an inventory of items are evaluated to determine for each of the items a score identifying a desirability of providing the item to a specific end-user. In some embodiments, one or more machine learning models are utilized in evaluating the catalog of items. For example, one or more of the machine models trained using the process of FIG. 4 are used to determine one or more prediction scores/values for each candidate item. The one or more machine learning models may utilize one or more attributes of the specific end-user to determine a match score for attributes of an item with the specific end-user.

An example of the machine learning model is an expected result prediction model that outputs a value indicating a likelihood an end-user will be satisfied with the item and will retain/purchase the item being evaluated. This model may utilize attributes of the specific end-user (e.g., gender, age group, geographical location, season, style preference, size, occupation, previous purchases, provided feedback/reviews about previously provided items, items already owned, etc.) to predict whether an item with its attributes will be likely retained/purchased by the end-user given historical observation training data on previous behaviors of end-users for previously provided items.

Another example of the machine learning model is an expert judgement prediction model that outputs a value indicating a likelihood a human expert will select for the specific end-user the item being evaluated. This model may utilize attributes of the specific end-user (e.g., gender, age group, geographical location, season, style preference, size, occupation, previous purchases, provided feedback/reviews about previously provided items, items already owned, etc.) to predict whether an item with its attributes will be likely chosen/approved by an expert for the specific end-user given historical observation training data on previous behaviors of experts for previously provided items.

A plurality of values may be determined for a particular item using a plurality of machine learning models, and an overall score is determined by using these plurality values. For example, a weighted sum of an output prediction of an expected outcome prediction model for an item and an output prediction of an expert judgment prediction model for the item is determined as the overall score used to rank the item.

Once a score has been determined for each eligible item in inventory (e.g., in stock items), the eligible items are sorted and ranked based on the scores to identify the items with the highest scores. These rankings and scores allow the large number of items in the catalog of items to be narrowed to a more manageable limited number of items presented to an expert as a recommended list for curation and selection for a specific end-user. This makes the item selection process for the expert more efficient and more accurate as well as enabling consideration of the entire large catalog of items (e.g., tens of thousands) that otherwise would not be feasible manually for a human expert.

At 504, based on evaluation metrics, a sorted list of at least a portion of the analyzed items is provided for an expert. For example, the expert is provided a user interface listing recommended items for selection and inclusion in a group set of items to be provided to the specific end-user being served by the expert. The items that are presented to the expert have been filtered/ranked in 502, which allows the expert to make a more focused decision among the top recommended items discovered by the machine learning models. The items have been sorted based on scores determined using machine learning and corresponding rank. For example, the top ranking items with the highest scores are presented first to the expert.

The order and/or placement of items in the user interface is based on the scores/ranks of the chosen items. For example, the items ranking highest with the best scores representing highest likelihood of acceptance/purchase by the end-user and/or highest likelihood of being selected by an expert are presented/listed in descending order from best to least best to allow faster and easier selection of top ranking items by the expert. The user interface may display a photograph of the selected subset of items as well as details about the items. The user interface may display a rank number/order and/or a recommendation prediction score associated with the item.

At 506, an indication of an expert selection of one or more items among the listed items to include in a group set of items to be provided to the end-user is received. For example, the expert indicates one or more items in the list to be included in a group set of items to be provided to the end-user. The group set of items to be provided to the end-user is to include a specified number of items and the expert is able to select one or more items for inclusion in the group set. Although the expert is able to select every one of the items to be included in the group set, the expert can choose to only select a portion of the items in the group set as a starting point and allow the rest of the items to be automatically selected based on the machine learning models.

At 508, one or more additional items to complete the group set of items is automatically determined. Using the one or more machine learning models, the catalog of items is evaluated to identify items to include in the group set of items.

Items in the group set are to be selected as a cohesive set where items already in the group set influence which additional items are included in the group set (e.g., contextual set analysis). Thus the expert judgement prediction machine learning model has been trained to identify likelihood of an item being selected by an expert for an end-user based at least in part on any items already in the item group set.

Contextual set selection analysis is performed in determining the additional items to include in the group set. Unlike general recommendation problems, coherence of a group of items selected for an end-user is important in contextual set selection. For example, if an expert stylist has already selected a pair of jeans, the expert and the end-user are less likely to want a second pair of jeans in the group set and more likely to want a blouse that pairs well with the jeans they already picked out.

A challenge of training and building a machine learning model to perform contextual set selection is that the space of possible sets is incredibly large and sparse compared to the observed sets. Considering all possible permutations and combinations among tens of thousands of items is computationally intensive and may be infeasible to perform with limited computer resources. For example, determining a score for every permutation of different combinations of items in the group set would be too computationally challenging to perform for every end-user. In other words, given an end-user M and inventory I, estimating probability P(S) of an expert selecting set S∈I is computationally challenging.

In various embodiments, to reduce computational complexity and improve computational performance of a computer performing the machine learning model training and inference, certain improvements are made.

In some embodiments, to reduce computational complexity, the set of selection probabilities is decomposed as a product of conditional probabilities by considering each individual item selection one at time. For example, each additional item to include in the group set is evaluated sequentially one at a time in the context of what has been already selected until the entire group set has been determined (e.g., P(ABC)=P(A) P(B|A) P(C|AB)). By considering only a single item at a time, the combinatorial explosion of the full joint selection space is avoided, at the cost of needing to model conditional context of varying size.

Even with the conditional probability simplification, the number of possible items may be too large to learn interactions directly. In some embodiments, latent item representations also allow further reduction of the number of free parameters in the model. Learning a latent representation for each item allows modeling of interactions between low-dimensional dense vectors rather than high-dimensional sparse vectors. Thus for example in some embodiments, the pooled set representation and contextual features are combined with two neural network hidden layers, providing a nonlinear transformation to an output layer with the same dimensionality as the item embeddings. Final estimated selection probabilities can then be taken as the softmax of the output layer with the items in inventory. Embedding vectors for inventory are learned and interactions are modeled in dense low-dimensional space (e.g., factorization). For example, in a neural factorization approach, item i is represented by k-dim embedding $v_i$ with a pooled conditional $x_c = \Sigma_{i \in C} v_i$, of items in the group set that is utilized along with end-user context features for an output of k-dim selection vector s. The output prediction is the softmax with embedding matrix: $p_i = \text{softmax}(s^T V)_i$, where loss is a negative log of observed items $-\log(p_i)$.

To determine each additional item to include in the group set, eligible items in the catalog of items are evaluated using one or more types of machine learning models to determine an overall evaluation score. The new item with the best overall evaluation score is selected for inclusion in the group set, and the process is repeated to select the next item to include in the group set, taking into consideration all of the items already included in the group set.

In some embodiments, the machine learning model includes the expert judgement prediction model that outputs a value indicating a likelihood a human expert will select for inclusion in the group set for the specific end-user the item being evaluated given the items already included in the group set. This model may utilize attributes of the specific end-user (e.g., gender, age group, geographical location, season, style preference, size, occupation, previous purchases, provided feedback/reviews about previously provided items, items already owned, etc.) as well as attributes of the items already in the group set and attributes of the item being considered for inclusion in the group set.

In some embodiments, the machine learning model includes the expected outcome prediction model that outputs a value indicating a likelihood an end-user will be satisfied with the item and will retain/purchase the item being evaluated. This model may utilize attributes of the specific end-user (e.g., gender, age group, geographical location, season, style preference, size, occupation, previous purchases, provided feedback/reviews about previously provided items, items already owned, etc.) to predict whether an item with its attributes will be likely retained/purchased by the end-user given historical observation training data on previous behaviors of end-users. In some embodiments, this expected outcome prediction model does not take into consideration the contextual group set and outputs a value without regard to items already in the group set. In another embodiment, the expected outcome prediction model does take into consideration the contextual group set and outputs a value taking into consideration items already in the group set. For example, the expected outcome prediction model utilizes attributes of the specific end-user as well as attributes of the items already in the group set and attributes of the item being considered for inclusion in the group set to determine the prediction value/score.

In some embodiments, a plurality of scores may be determined for a particular candidate item using a plurality of machine learning models, and an overall score is determined by using these plurality values. For example, a weighted sum of an output value of the expected outcome prediction model for an item and an output value of the expert judgment prediction model for the item is determined as the combined score used to rank the candidate item. Once a score has been determined for each eligible item in inventory (e.g., in stock items not already in the group set), the eligible items are sorted and ranked based on the overall scores to identify the item with the highest score for inclusion in the group set. Then, if the group set is not yet complete, the next item for inclusion in the group set is determined by evaluating the inventory items again using the machine learning model(s) given the group set with the additional included item.

At 510, items in the completed group set of items are presented to the expert. For example, items in the group set are visually displayed to the expert and the expert is able to finalize the group set by approving it or swapping one or more items in the group set with another item that the expert believes is a better match for the end-user.

If at 512 an approval of the group set is received, at 514, the group set is provided to the end-user. For example, a shipment of the group items may be provided to the end-user. The end-user may then decide to keep or return one or more of the items in the shipment. In some embodiments, in the event the end-user decides to retain an item, then the customer purchases the item. Information about the items such as whether they were kept or returned, when they were kept or returned, and/or who/what type of customer kept or returned the item, among others, can be stored and utilized to retrain machine learning model(s).

If at 512 an approval of the group set is not received, at 516, an indication of an item in the group set to replace is received. For example, the expert indicates using a user interface an item the expert would like to remove from the group set and replace with a different item.

At 518, replacement item candidates are determined and presented to the expert. In some embodiments, each eligible item (e.g., in stock, not in the group set, and an item being replaced) in the inventory of items is evaluated using one or more of the machine learning models to determine an overall score for each of the eligible items. For example, a plurality of scores are determined for a particular candidate item using a plurality of machine learning models, and an overall score is determined as a weighted sum of an output value of the expected outcome prediction model for the candidate item and an output value of the expert judgment prediction model for the candidate item in the context of other items remaining in the group set. The overall scores used to rank and sort the candidate items, and the candidate items are displayed in the order of the sorted list.

At 520, an indication of the replacement item is received, and the replacement item is included in the group set. For example, one of the presented replacement item candidates is selected by the expert and this item is included in the group set. The process returns to 510, where items in a new completed group set of items are presented to the expert.

Figure 6A:
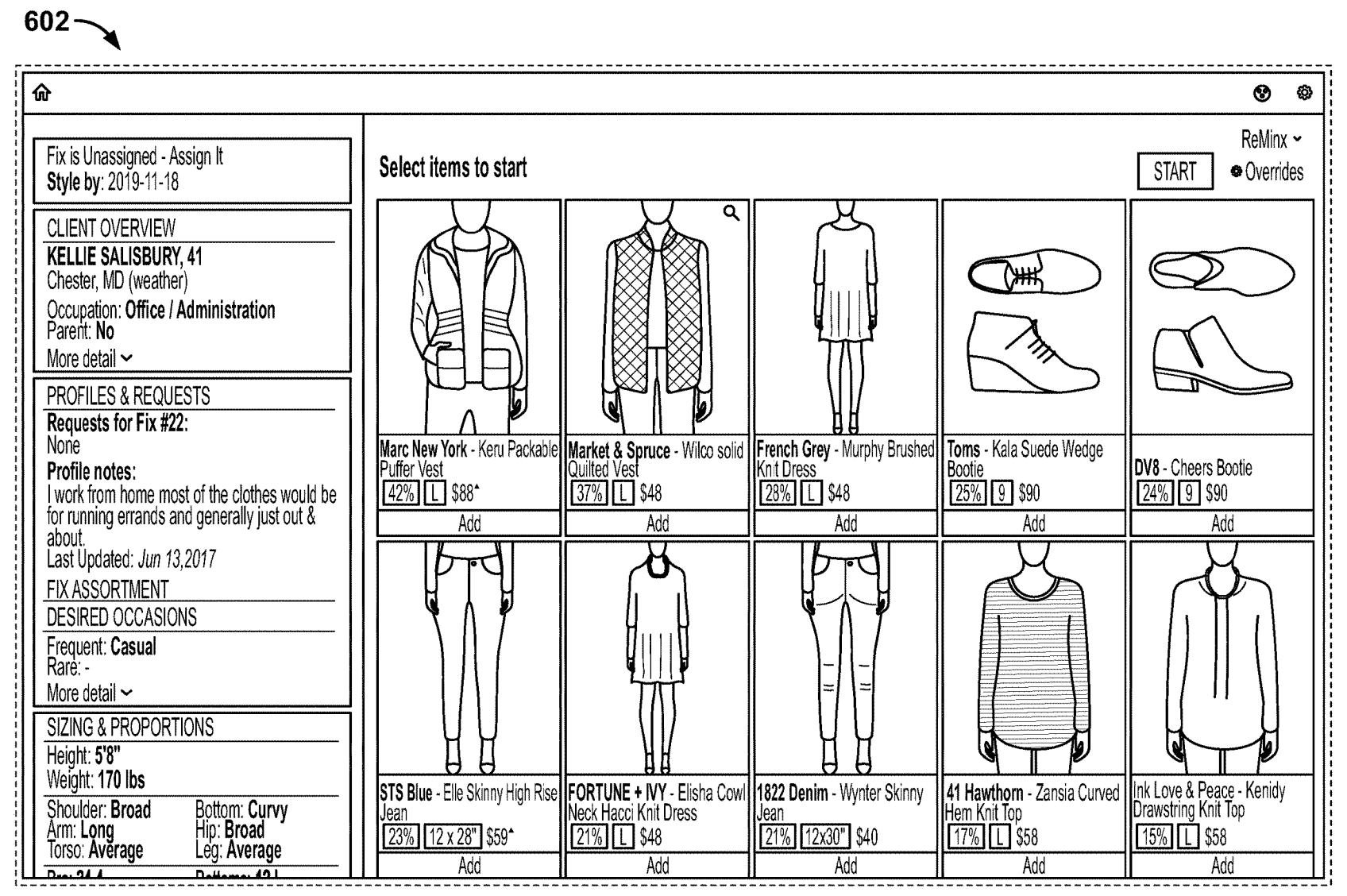
Figure 6B:
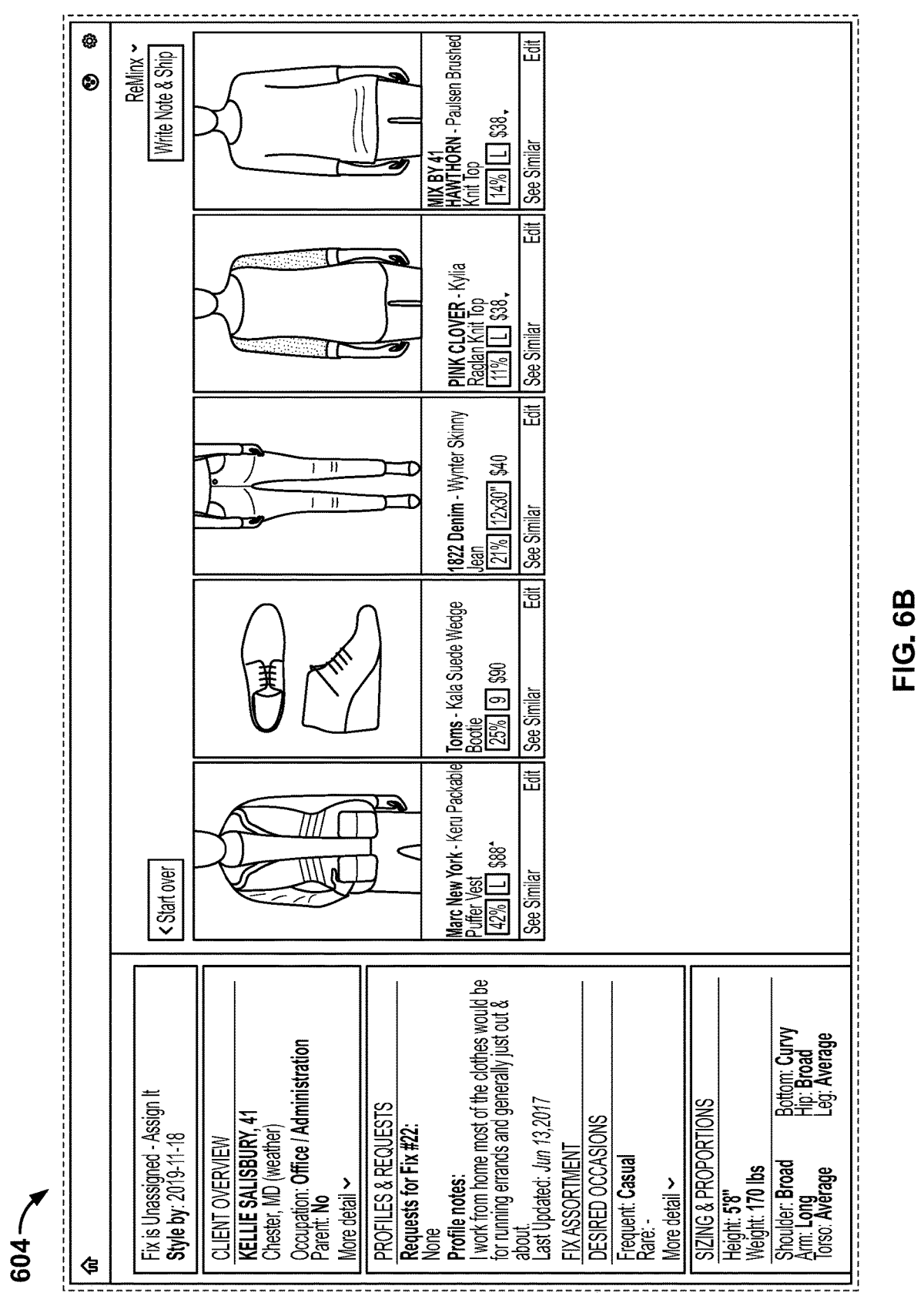
Figure 6C:
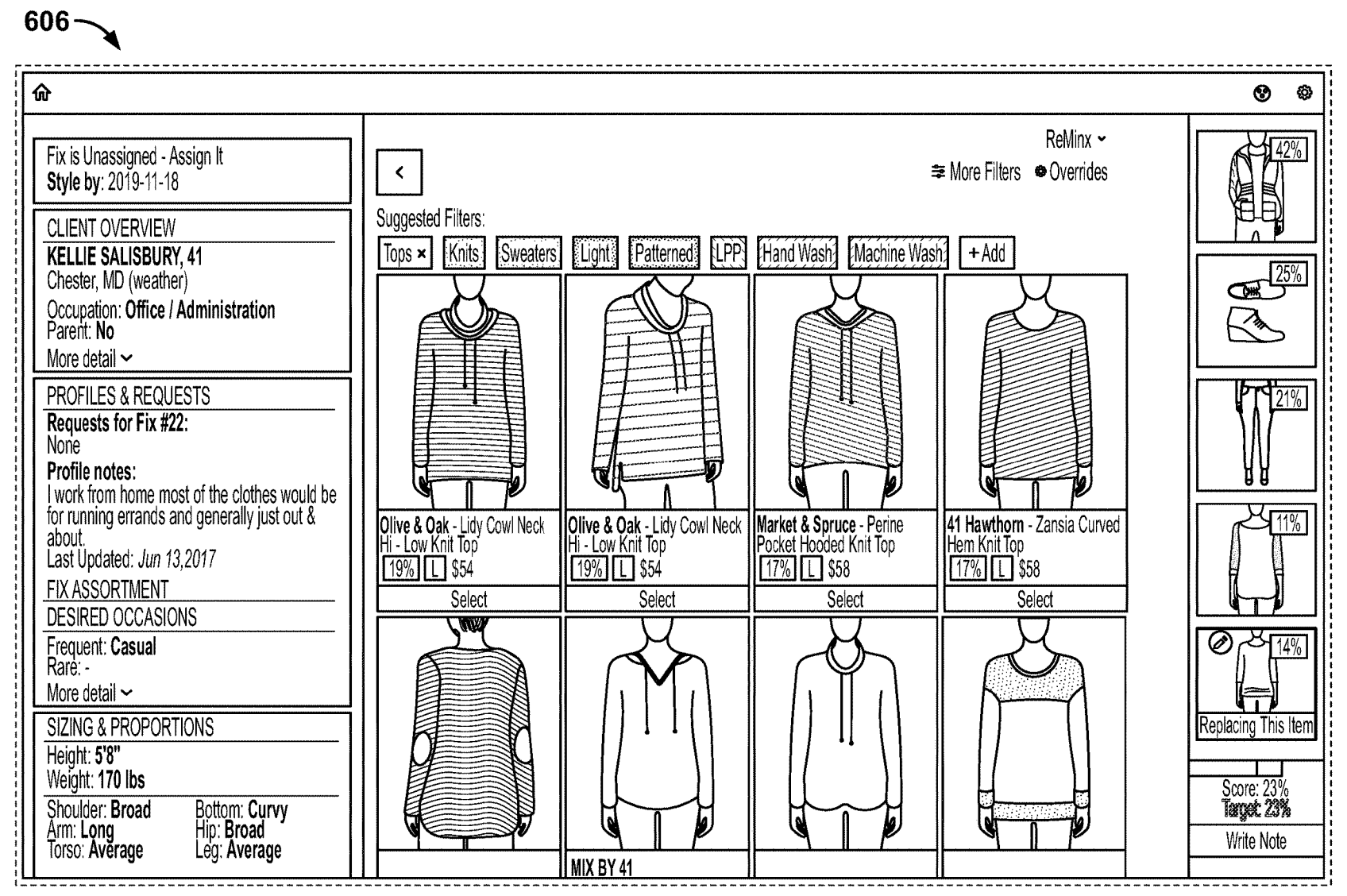

FIGS. 6A-6C are diagrams illustrating embodiments of user interfaces for determining a group set of items. User interface 602 of FIG. 6A shows a listing of items recommended for a specific end-user. The listing of items is an example of the list provided in 504 of FIG. 5 (e.g., analyzed in 502). For each item, the shown listing displays an image of the item, a brand of the item, a name/description of the item, a price and size of the item, and a corresponding match score (e.g., determined using the machine learning models trained using the process of FIG. 4). The items have been ordered based the match scores. An expert reviews user interface 602 and selects one or more items for inclusion in a group set to be provided to an end-user by selecting the corresponding "Add" button for the desired item(s). User interface 604 of FIG. 6B shows a listing of items included in the group set (e.g., presented in 510 of FIG. 5). In some embodiments, one or more of the items in the group set have been automatically determined for inclusion in the set at 508 of FIG. 5. The first three items in the group set has been selected by the expert and the last two items have been automatically selected taking into consideration the items already selected to be in the group set. The expert reviewing the items in the group set may accept the group set for shipment to the end-user or replace an item in the group set by selecting either the "See Similar" button (e.g., see recommendations similar to the item for replacement) or "Edit" button (e.g., see recommendations alternative to the item for replacement) corresponding to the item to be replaced. User interface 606 of FIG. 6C shows a listing of replacement item candidates for an item to be replaced from the group set (e.g., listing determined and presented in 518 of FIG. 5). For each candidate replacement item, the shown listing displays an image of the item, a brand of the item, a name/description of the item, a price and size of the item, and a corresponding match score (e.g., determined using the machine learning models trained using the process of FIG. 4). The replacement candidate items have been ordered based the match scores. An expert reviews user interface 606 and selects a replacement item for inclusion in the group set by selecting the corresponding "Select" button for the desired item.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
providing an initial list of candidate items automatically evaluated and chosen for an end-user;
receiving a selection of one or more items in the initial list of candidate items from an expert user different than the end-user to include in an item group set for the end-user;
evaluating eligible items to identify an additional item to include in the item group set based at least in part on an output prediction machine learning model trained to estimate a probability the end-user will like a given item selected by the expert user for the end-user and an expert judgment prediction machine learning model trained to predict based at least in part on the one or more items already in the item group set a likelihood of a certain item being evaluated would be selected for inclusion in the item group set, wherein the output prediction machine learning model is trained based in part on previous purchase histories of a plurality of different end-users;
based on the evaluation, including the additional item in the item group set;
indicating member items in the item group set;
receiving end-user feedback regarding the member items in the item group set; and
retraining the output prediction machine learning model based on the end-user feedback.

2. The method of claim 1, wherein the output prediction machine learning model and the expert judgment prediction machine learning model generate a corresponding overall score for each item included in the item group set.

3. The method of claim 2, wherein evaluating the initial list of candidate items includes using the expert judgment prediction machine learning model.

4. The method of claim 1, wherein the initial list of candidate items are automatically ranked and provided in an order based on the rankings.

5. The method of claim 1, wherein the item group set is to include a preconfigured number of items to be shipped together to the end-user.

6. The method of claim 1, wherein evaluating the eligible items includes determining a corresponding machine learning prediction score for each of the eligible items among an inventory of items and identifying an item with a best prediction score as the additional item to include in the item group set.

7. The method of claim 6, wherein determining the corresponding machine learning prediction score includes utilizing an outcome prediction machine learning model trained to predict a likelihood that the certain item being evaluated would be purchased by the end-user.

8. The method of claim 7, wherein determining the machine learning prediction score includes determining a weighted sum of an output of the expert judgment prediction machine learning model and an output of the outcome prediction machine learning model.

9. The method of claim 1, wherein a plurality of items are to be automatically identified for inclusion in the item group set and each additional item in the plurality of items to be automatically identified is serially determined by using different iterations of the expert judgment prediction machine learning model that accounts for any previously determined additional item in the item group set to determine a next additional item in the item group set.

10. The method of claim 1, further comprising receiving expert user feedback that includes receiving an approval of the member items in the item group set from the expert user and causing the item group set to be provided to the end-user.

11. The method of claim 1, wherein the expert user feedback includes receiving an indication from the expert user to replace one of the member items in the item group set.

12. The method of claim 11, further comprising evaluating at least a portion of the eligible items to identify a ranked list of replacement item candidates at least in part by using the expert judgment prediction machine learning model.

13. The method of claim 12, wherein the expert user feedback includes receiving a selection of one of the replacement item candidates from the expert user and further comprising replacing the indicated member item in the item group set with the selected replacement item candidate.

14. The method of claim 1, wherein the item group set includes clothing items.

15. A system, comprising:
a processor configured to:
provide an initial list of candidate items automatically evaluated and chosen for an end-user;
receive a selection of one or more items in the initial list of candidate items from an expert user different than the end-user to include in an item group set for the end-user;
evaluate eligible items to identify an additional item to include in the item group set based at least in part on an output prediction machine learning model trained to estimate a probability the end-user will like a given item selected by the expert user for the end-user and an expert judgment prediction machine learning model trained to predict based at least in part on the one or more items already in the item group set a likelihood of a certain item being evaluated would be selected for inclusion in the item group set, wherein the output prediction machine learning model is trained based in part on previous purchase histories of a plurality of different end-users;
based on the evaluation, include the additional item in the item group set;
indicate member items in the item group set;
receive end-user feedback regarding the member items in the item group set; and
retrain the output prediction machine learning model based on the end-user feedback; and
a memory coupled to the processor and configured to provide the processor with instructions.

16. The system of claim 15, wherein the output prediction machine learning model and the expert judgment prediction machine learning model generate a corresponding overall score for each item included in the item group set.

17. The system of claim 16, wherein evaluating the eligible items includes utilizing the outcome prediction machine learning model trained to predict the likelihood that the certain item being evaluated would be purchased by the end-user.

18. The system of claim 16, wherein a plurality of items are to be automatically identified for inclusion in the item group set and each additional item in the plurality of items to be automatically identified is serially determined by using different iterations of the expert judgment prediction machine learning model that accounts for any previously determined additional item in the item group set to determine a next additional item in the item group set.

19. The system of claim 16, wherein the expert user feedback includes an indication from the expert user to replace one of the member items in the item group set and the processor is further configured to evaluate at least a portion of the eligible items to identify a ranked list of replacement item candidates at least in part by using the expert judgment prediction machine learning model.

20. A computer program product, the computer program product being embodied in a non-transitory computer readable storage medium and comprising computer instructions for:
providing an initial list of candidate items automatically evaluated and chosen for an end-user;
receiving a selection of one or more items in the initial list of candidate items from an expert user different than the end-user to include in an item group set for the end-user;
evaluating eligible items to identify an additional item to include in the item group set based at least in part on an output prediction machine learning model trained to estimate a probability the end-user will like a given item selected by the expert user for the end-user and an expert judgment prediction machine learning model trained to predict based at least in part on the one or more items already in the item group set a likelihood of a certain item being evaluated would be selected for inclusion in the item group set, wherein the output prediction machine learning model is trained based in part on previous purchase histories of a plurality of different end-users;
based on the evaluation, including the additional item in the item group set;
indicating member items in the item group set;
receiving end-user feedback regarding the member items in the item group set; and
retraining the output prediction machine learning model based on the end-user feedback.

* * * * *